United States Patent
Schwoerer et al.

(10) Patent No.: US 12,438,635 B2
(45) Date of Patent: Oct. 7, 2025

(54) METHOD FOR MANAGING COMMUNICATION BETWEEN TERMINALS IN A TELECOMMUNICATIONS SYSTEM AND DEVICES FOR IMPLEMENTING THE METHOD

(71) Applicant: Orange, Issy-les-Moulineaux (FR)

(72) Inventors: Jean Schwoerer, Chatillon (FR); Raphaël Visoz, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 608 days.

(21) Appl. No.: 17/787,466

(22) PCT Filed: Dec. 14, 2020

(86) PCT No.: PCT/FR2020/052423
§ 371 (c)(1),
(2) Date: Jun. 20, 2022

(87) PCT Pub. No.: WO2021/123586
PCT Pub. Date: Jun. 24, 2021

(65) Prior Publication Data
US 2023/0022762 A1  Jan. 26, 2023

(30) Foreign Application Priority Data
Dec. 20, 2019 (FR) ...................... 1915145

(51) Int. Cl.
*H04W 4/00* (2018.01)
*H04L 1/00* (2006.01)
(Continued)

(52) U.S. Cl.
CPC ........... *H04L 1/0015* (2013.01); *H04W 24/08* (2013.01); *H04W 88/06* (2013.01)

(58) Field of Classification Search
CPC .................................................. H04W 88/06
See application file for complete search history.

(56) References Cited

U.S. PATENT DOCUMENTS

| 2005/0201311 A1* | 9/2005 | Willey | H04W 68/00 370/348 |
| 2005/0213518 A1 | 9/2005 | Ahya et al. | |
| 2007/0116194 A1* | 5/2007 | Agapi | H04M 7/0045 379/88.01 |

(Continued)

FOREIGN PATENT DOCUMENTS

| CN | 101297541 A | 10/2008 |
| CN | 105100511 A | 11/2015 |

(Continued)

OTHER PUBLICATIONS

English translation of the Written Opinion of the International Searching Authority dated Apr. 16, 2021 for corresponding International Application No. PCT/FR2020/052423, filed Dec. 14, 2020.

(Continued)

*Primary Examiner* — Elisabeth Benoit Magloire
(74) *Attorney, Agent, or Firm* — David D. Brush; Westman, Champlin & Koehler, P.A.

(57) ABSTRACT

A method for managing a communication set up according to a first communication mode between terminals in a telecommunications system. The method includes: obtaining, by a first terminal participating in the communication, a request to change communication mode so as to transition from the first communication mode to a second communication mode; switching the communication from the first communication mode to the second communication mode; wherein the first communication mode and the second communication mode are different communication modes in a set comprising a two-way voice communication mode, a one-way voice communication mode, and a text-based communication mode.

20 Claims, 6 Drawing Sheets

(51) Int. Cl.
*H04W 24/08* (2009.01)
*H04W 88/06* (2009.01)

(56) References Cited

U.S. PATENT DOCUMENTS

| | | | | |
|---|---|---|---|---|
| 2007/0171861 A1* | 7/2007 | Akhtar | H04W 4/10 | 370/395.2 |
| 2008/0147407 A1* | 6/2008 | Da Palma | G10L 15/22 | 704/E15.04 |
| 2013/0278405 A1* | 10/2013 | Bacal | H04K 3/415 | 340/439 |
| 2014/0235214 A1* | 8/2014 | Yue | H04W 76/00 | 455/414.1 |
| 2015/0340037 A1* | 11/2015 | Kim | H04M 1/651 | 704/235 |
| 2016/0035343 A1* | 2/2016 | Tang | G10L 13/00 | 704/260 |
| 2016/0270025 A1* | 9/2016 | Osann, Jr. | H04M 1/72463 | |
| 2018/0359017 A1* | 12/2018 | Kwon | H04B 7/0874 | |
| 2019/0215729 A1* | 7/2019 | Oyman | H04L 65/1016 | |
| 2020/0107202 A1* | 4/2020 | Teng | H04L 5/14 | |
| 2020/0162221 A1* | 5/2020 | Wong | H04L 1/1671 | |

FOREIGN PATENT DOCUMENTS

| | | |
|---|---|---|
| CN | 106791567 A | 5/2017 |
| WO | 2015133726 A1 | 9/2015 |

OTHER PUBLICATIONS

International Search Report dated Apr. 7, 2021 for corresponding International Application No. PCT/FR2020/052423, Dec. 14, 2020.
Written Opinion of the International Searching Authority dated Apr. 7, 2021 for corresponding International Application No. PCT/FR2020/052423, filed Dec. 14, 2020.
Anonymous, "FaceTime: Poor Connection Error on the iPhone or iPad, Fix—AppleToolBox", Apr. 2, 2015 (Apr. 2, 2015), Retrieved from the Internet: URL:https://appletoolbox.com/facetime-poor-connection-error-on-the-iphone-or-ipad-fix/, XP055726726.
English machine translation of Anonymous, "Informationen zu "WLAN-Unterstützung"—Apple Support", May 31, 2018 (May 31, 2018), p. 1-2, Retrieved from the Internet: URL:https://support.apple.com/de-de/HT205296, XP055726725.
Chinese Office Action dated May 12, 2025 for corresponding Chinese Application No. 202080096212.8.

* cited by examiner

METHOD FOR MANAGING COMMUNICATION BETWEEN TERMINALS IN A TELECOMMUNICATIONS SYSTEM AND DEVICES FOR IMPLEMENTING THE METHOD

CROSS-REFERENCE TO RELATED APPLICATIONS

This Application is a Section 371 National Stage Application of International Application No. PCT/FR2020/052423, filed Dec. 14, 2020, the content of which is incorporated herein by reference in its entirety, and published as WO 2021/123586 on Jun. 24, 2021, not in English, which claims priority benefit to French Patent Application No. 19 15145, filed Dec. 20, 2019, the content of which is incorporated herein by reference in its entirety.

FIELD

The present subject disclosure refers to a method for managing communication between terminals in a telecommunications system, as well as to devices and software for implementing this method.

BACKGROUND

Extended coverage mobile networks, such as LTE-M type networks, enable mobile terminals to continue to participate in data or voice communication when they are no longer found under the nominal radio coverage of the network, by using an extended radio coverage mechanism. This coverage extension generally uses the transmission of a certain number of repetitions, which are recombined by the receiver of the data receiving terminal. When the coverage extension need increases, the number of repetitions also increases.

The repetitions that occur in the transmission of data from and/or to the mobile terminal may increase the transmission latency of end-to-end data, i.e. between the mobile terminal and the network node (which may be another terminal) with which the data are exchanged for a communication in progress and may reduce the rate available for the communication. In the case of voice communication, excessive end-to-end latency may become a hindrance to the users in communication, or even lead to an interruption in the communication when the latency exceeds a predetermined threshold. Therefore, an increase in end-to-end latency and a reduction in rate may be observed, both as a result of an increase in the coverage extension level.

An object of the present subject disclosure is to remedy, at least partially, the aforementioned disadvantages.

SUMMARY

According to a first aspect, a method for managing communication between terminals in a telecommunications system is proposed. The proposed method comprises, when the communication is set up according to a first communication mode: obtaining, by a first terminal participating in the communication, a request to change communication mode so as to transition from the first communication mode to a second communication mode; switching the communication from the first communication mode to the second communication mode; wherein the first communication mode and the second communication mode are different communication modes in a set comprising a two-way voice communication mode, a one-way voice communication mode, and a text-based communication mode.

In one or more embodiments, the telecommunications system may comprise a radio access network infrastructure, and the first terminal may be a radio terminal and the communication uses a radio communication link between the first terminal and the radio access network infrastructure of the telecommunications system.

In one or more embodiments, the radio access network infrastructure may be a network infrastructure with extended radio coverage and the first terminal may be located in an extended radio coverage zone of the radio access network infrastructure of the telecommunications system.

In one or more embodiments, obtaining the request may comprise, at the first terminal: receiving the request to change communication mode from an access network infrastructure of the telecommunications system.

In one or more embodiments, obtaining the request may comprise, at the first terminal: receiving the request to change communication mode from a second terminal participating in the communication.

In one or more embodiments, obtaining the request may comprise, at the first terminal: generating the request to change communication mode so as to transition from the first communication mode to the second communication mode.

In one or more embodiments, the proposed method may also comprise, at the first terminal: transmitting, to a second terminal participating in the communication, a request to change communication mode so as to transition from the first communication mode to the second communication mode.

In one or more embodiments, communication between the first terminal and the second terminal may use a communication link, and the proposed method may also comprise, at the first terminal: obtaining quality measurements of the communication link and generating the request to change communication mode on the basis of the communication link quality measurements.

In one or more embodiments, obtaining the communication link quality measurements may comprise: receiving the measurements or generating the measurements.

In one or more embodiments, the communication link quality measurements may relate to a quality criterion of the communication link, the quality criterion comprising a criterion of the end-to-end latency of the communication, a communication link rate criterion, and/or a criterion using a radio communication parameter.

In one or more embodiments, the criterion using a radio communication parameter may relate to a power of a radio signal received by the first terminal, and/or to a number of repetitions in the radio signal transmission.

In one or more embodiments, the proposed method may also comprise: generating on a man-machine interface of the first terminal a message signaling the communication mode change so as to transition from the first communication mode to a second communication mode.

In one or more embodiments, the proposed method may also comprise: receiving a user input relating to the communication mode change so as to transition from the first communication mode to a second communication mode.

In one or more embodiments, the proposed method may also comprise: on switching communication to the text-based communication mode from a voice communication mode, displaying on a graphical interface of the first terminal a text content based on a transcript of a voice content of the communication in audio mode before switching to the text-based communication mode.

According to a second aspect, a method for managing communication between terminals in a telecommunications system comprising a network infrastructure is proposed, the method comprising, at an access network infrastructure node, the communication being in progress according to a first communication mode: determining a variation in quality of the communication link used by a first terminal participating in the communication and connected to the network infrastructure, based on the determination of the variation in quality of the communication link, transmitting to the first terminal a request to change communication mode so as to transition from the first communication mode to a second communication mode, wherein the first communication mode and the second communication mode are different communication modes in a set comprising a two-way voice communication mode, a one-way voice communication mode, and a text-based communication mode.

According to another aspect, terminal equipment comprising a processor and a communication interface operatively coupled to the processor, configured to implement a method proposed in the present description, is proposed.

According to another aspect, a data communication network node comprising a processor and a communication interface operatively coupled to the processor, the network node being configured to implement a method proposed in the present description, is proposed.

Another aspect relates to a computer program, loadable in a memory associated with a processor, and comprising portions of code for implementing a method such as proposed in the present description during execution of said program by the processor.

Another aspect relates to a set of data representing, for example by compressing or encoding, a computer program such as proposed in the present description.

Another aspect relates to a non-transitory storage medium of a computer executable program, comprising a set of data representing one or more programs, said one or more programs comprising instructions for, during the execution of said one or more programs by a computer comprising a processor operatively coupled to a memory and to a data communication input-output interface, causing the computer to implement the proposed method according to one of the embodiments proposed in the present description.

BRIEF DESCRIPTION OF THE DRAWINGS

Other special features and advantages of the present subject disclosure will appear in the description below of non-limiting embodiments, with reference to the appended drawings, in which.

FIG. 1 is a diagram illustrating an example of a telecommunications system for implementing one or more embodiments of the proposed method;

DETAILED DESCRIPTION OF ILLUSTRATIVE EMBODIMENTS

Figure 1:
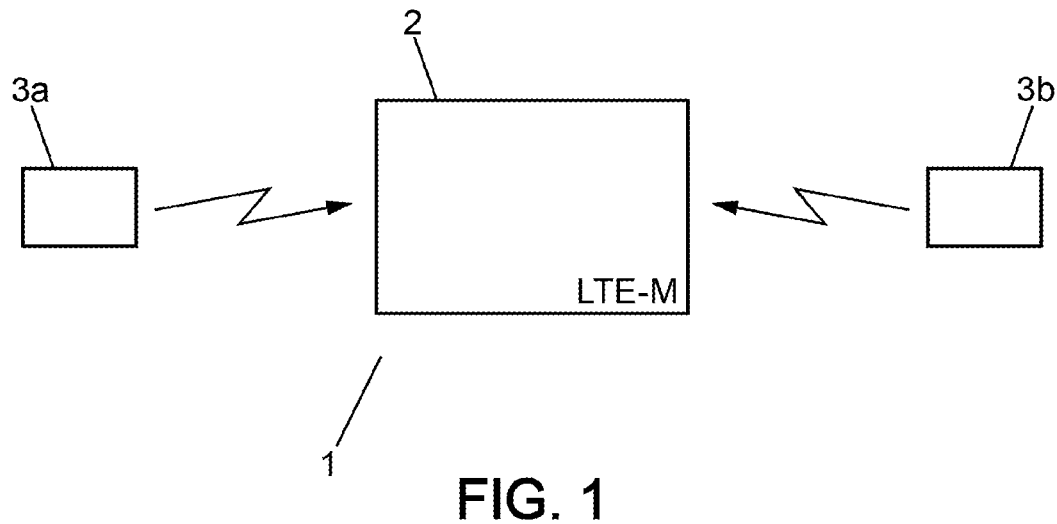
FIG. 1

In the detailed description below of embodiments of the present subject disclosure, many specific details are presented to provide a more complete understanding. Nevertheless, the person skilled in the art may realize that the embodiments can be put into practice without these specific details. In other cases, well-known features are not described in detail to avoid unnecessarily complicating the present description.

The present description refers to functions, motors, units, modules, platforms, and diagram illustrations of methods and devices according to one or more embodiments. Each of the functions, motors, modules, platforms, units, and diagrams described may be implemented as hardware, software (including as embedded software ("firmware") or ("middleware")), microcode, or any combination thereof. In the case of implementation as software, the functions, motors, units, modules, and/or diagram illustrations may be implemented by computer program instructions or software code, which may be stored or transmitted on a computer-readable medium, including a non-transitory medium, or a medium loaded into the memory of a generic, specific, computer, or any other programmable data processing device or apparatus to produce a machine, such that the computer program instructions or software code executed on the computer or apparatus or programmable data processing device constitute means for implementing these functions.

Embodiments of a computer-readable medium include, but are not limited to, computer storage media and communication media, including any media facilitating the transfer of a computer program from one location to another. "Computer storage medium/media" is understood to refer to any physical medium that can be accessed by computer. Examples of computer storage media include, but are not limited to, flash memory drives or components or any other flash memory devices (for example USB keys, memory keys, memory sticks, disk keys), CD-ROMs or other optical data storage devices, DVDs, magnetic disk data storage devices or other magnetic data storage devices, data memory components, RAM, ROM, EEPROM, memory cards ("smart cards"), SSD ("Solid State Drive") type memories, and any other form of medium usable to transport or store or save data or data structures that can be read by a computer processor.

In addition, various forms of computer-readable media can transmit or carry instructions to a computer, such as a router, gateway, server, or any data transmission device, whether by wired transmission (by coaxial cable, fiber optic, telephone wires, DSL cable, or Ethernet cable), wireless transmission (by infrared, radio, cellular, microwave), or virtualized transmission devices (virtual router, virtual gateway, virtual tunnel endpoint, virtual firewall). Depending on the embodiments, the instructions may include code of any computer programming language or computer program element, such as, without limitation, assembly languages, C, C++, Visual Basic, HyperText Markup Language (HTML), Extensible Markup Language (XML), HyperText Transfer Protocol (HTTP), Hypertext Preprocessor (PHP), SQL, MySQL, Java, JavaScript, JavaScript Object Notation (JSON), Python, and Bash scripting.

In addition, the terms "in particular," "for example," "example," "typically" are used in the present description to designate examples or illustrations of non-limiting embodiments which do not necessarily correspond to embodiments that are preferred or advantageous in comparison to other possible aspects or embodiments.

The terms "network" and "communication network" as used in the present description refer to one or more data links that can couple or connect devices, possibly virtualized, so as to allow the transport of electronic data between computer systems and/or modules and/or other electronic devices or equipment, such as between a server and a client device or other types of devices, including between wireless devices coupled or connected by a wireless network, for example. A network may also include mass storage for storing data, such as a NAS ("network attached storage"), a SAN ("storage area network"), or any other form of medium readable by a computer or by a machine, for example. A network may include, in full or in part, the Internet, one or more local area networks (LANs), one or more WAN ("wide area networks") type networks, connections of the wired, wireless, cellular type, or any combination of these different networks. Similarly, subnetworks may use different architectures or be compliant or compatible with different protocols, and interoperate with larger networks. Different types of devices may be used to render different architectures or different protocols interoperable. For example, a router may be used to provide a communication link or a data link between two LANs that would otherwise be separate and independent.

The terms "operatively coupled," "coupled," "mounted," "connected," and their various variants and forms used in the present description refer to couplings, connections, assemblies, which may be direct or indirect, and in particular comprise connections between electronic devices or between portions of such devices that enable operations and functions as described in the present description. In addition, the terms "connected" and "coupled" are not limited to physical or mechanical connections or couplings. For example, an operable coupling may include one or more wired connections and/or one or more wireless connections between two or more devices which allow simplex and/or duplex communication links between devices or portions of devices. According to another example, an operable coupling or a connection may include a coupling by wired and/or wireless link to enable data communications between a server of the proposed system and another device of the system.

The terms "application" or "application program" (AP) and their variants ("app," "webapp,"etc.) as used in the present description correspond to any tool that functions and is operated by means of a computer, to provide or execute one or more functions or tasks for a user or another application program. To interact with and control an application program, a user interface may be provided on the device on which the application program is implemented. For example, a graphical user interface (GUI) may be generated and displayed on a screen of the user device, or an audio user interface may be provided to the user by using a speaker, headphones, or an audio output.

In the present description, "voice communication mode" is understood to refer to any conversational type communication mode using the voice. A communication in two-way voice communication mode corresponds to a communication in voice communication mode wherein voice signals (typically speech signals) can be exchanged between two terminals simultaneously in two directions. A communication in one-way voice communication mode corresponds to a communication in voice communication mode wherein the voice signals (typically speech signals) can be exchanged between two terminals simultaneously in two directions, but only in one direction at a given point in time. "Push-To-Talk" (PTT) type conversations, typically used in professional mobile radio (PMR) networks, are examples of communications in one-way voice communication mode. In the present description, "text-based communication mode" is understood to refer to any conversational type communication mode using text content messages. Exchanges of text messages, of the SMS type or of any other text messaging type (such as text messages exchanged through a voice or text communication application) are examples of communication in text-based communication mode. The person skilled in the art will understand that the proposed method is not limited to a particular type of voice communication mode or text-based communication mode, and that it can advantageously be implemented with all types of voice communication and with all types of text-based communication. In addition, the implementation of the proposed method can use, depending on the embodiment, any voice communication technology and any text-based communication technology.

Since the development of radio communications, telephony, i.e. the capacity to have a "natural" conversation from a distance, has long been the central goal of public communications services.

However, making it possible for a telephone communication to smoothly progress in the manner of a natural conversation suggests that the means of communication can guarantee certain capacities, in the absence of which the conversation will no longer be natural, or even possible. These requirements to be guaranteed include, in particular: (1) bi-directionality: it must be possible to hear what your discussion partner says at any time, including when you yourself are talking. This is "full-duplex" communication. When this capacity is not ensured and each speaker must then speak in turn, this is semi-duplex communication; (2) Immediacy: in order to enable interaction between two speakers, and in particular to enable a natural use and understanding of the reactions to what the other says, latency, i.e. the time elapsed between the transmission of a signal by one of the speakers and its perception by the other, must be sufficiently reduced. It is common to consider that beyond 100 ms of latency, a hindrance is observed, and beyond 400 ms a natural conversation is no longer possible; (3) A sufficient capacity to transmit a quality audio signal. Since the abandonment of analog communications, the voice is digitized and transported in this format, with a sufficient rate to guarantee, more than just intelligibility, the acoustic comfort of the listener. This digital audio signal may be transported as is, or, if the available rate is insufficient, it may be compressed by means of a codec. Different codecs make it possible to reach lesser compression rates, but it should be noted that the higher the compression, the more the resulting signal will be adapted to a low rate channel, and the more its audio quality will be deteriorated.

To provide a conversational telecommunications service, public telephone networks have been provisioned to satisfy these requirements.

However, in other contexts and in particular in the context of low-rate networks designed for the Internet of Things or IoT, these requirements are not necessarily available, and other forms of communication have emerged. In particular, "semi-duplex" or "simplex" audio conversations and text-based conversations are noted.

In "semi-duplex" audio conversations, the participants each speak in turn. Participants who are not speaking must therefore wait until the active speaker has spoken before being able to take their turn. This is typically the case with a conversation carried out by using walkie-talkies, also called PTT ("Push-To-Talk"). In such a scenario, the capacity requirement is divided by two, and the latency requirement disappears.

In text conversations, participants exchange written messages in interactive mode instead of exchanging messages by speech. This is typically the case with a conversation by SMS ("Short Message Service"). For this type of conversation, latency is no longer critical, and the required rate is also very low.

Today all technologies are well mastered by the person skilled in the art and are commonly used throughout the world. However, their implementation remains segmented, depending on the type of network used. Therefore a full-duplex telephone communication will be maintained by the network as long as the network is capable of fulfilling the requirements enabling it to support the communication. If, in the case where one of the communication terminals uses a radio link, the communication cannot be maintained by the network as a result of radio link evolution, and will simply be interrupted without any other form of adaptation.

This scenario is mainly due to the fact that telecommunications infrastructures, particularly telephone networks, have historically been designed and deployed around a central usage. Consequently, the technical requirements of the usage at issue were considered, and as a consequence were satisfied in as much as the terminals were located in a zone (for example, a radio zone) served by the network.

However, the emergence in recent decades of data networks has made it possible to disassociate the infrastructure from the usage of them: when a data network is deployed, a data transport capacity is made available, without the possibility of saying with certainty which usage will be supported by this capacity. Therefore, an IP ("Internet Protocol") network may support file transfers, audio broadcasts and voice or videoconference conversations as well as simple text message conversations. The recent appearance in mobile networks of communication modes adapted to the constraints of the Internet of Things, i.e. only necessitating a relatively low rate and having only a few latency constraints, but presenting a considerably extended radio coverage compared to normal mobile network coverage, has again extended the mobile network connectivity range beyond conversational voice. The minimal connectivity offering offered by networks was in fact extended beyond the support of conversational voice service by being based on the transmission of low rate data with latencies that could be significant for communication between machines (IoT).

In parallel, while data exchange connections have long been fixed infrastructures (for example, cable network and/or fiber optic infrastructure) offering a certain constancy in their capacities, a basic shift is observed that consists of relying more on exchanging data in movement by radio. Therefore, at this time 4th-generation mobile networks only function by exchanging data packets, even for conveying a telephone conversation. However, if the inherent feature of radio networks is to enable terminal mobility, the associated consequence is the variability, sometimes fairly high, in the capacity of the link between the radio network (for example, a base station) access infrastructure element and the terminals.

In other words, the evolution in the quality of radio links depending on time, network load and terminal mobility may result in the capacity of the connection between two terminals not being able to continually fulfill the same link quality requirements. Technologies have, for example, been developed to dynamically adapt audio compression rates depending on link quality. But once the upper limit of this compression rate is reached, communication is no longer possible. Such variations in compression rate may typically lead to a sudden interruption in telephone communication, for example when a radio terminal of the communication is too far from its serving base station. In such a situation, if the remaining quality of the connection permits this, the users can switch to another conversation mode that is better adapted to the weakness of the connection, for example, the users may decide to continue the conversation by text messaging.

FIG. 1 is a diagram illustrating one or more embodiments wherein a telecommunications system (1) comprises a wireless network infrastructure (2), for example an object network infrastructure connected, for example according to LTE-M technology, and two terminals (3a and 3b) connected to the network infrastructure (2) and in communication.

One thus considers a communication set up between several terminals (in the example illustrated in FIG. 1, between two mobile terminals (3a, 3b)) in a telecommunications system (1), the communication being set up according to a first communication mode.

This first communication mode may, depending on the case, be a two-way voice (of the conversational type) communication mode, a one-way voice communication mode, or a text-based communication mode.

The person skilled in the art will understand that the proposed method is not limited to a particular architecture or to a particular technology for the telecommunications system (1), and that the proposed method may be implemented in any telecommunications system wherein a plurality of terminals may be in communication according to a communication mode in a set comprising a two-way voice communication mode, a one-way voice communication mode, and a text-based communication mode.

Below is described a method for managing communication between terminals in a telecommunications system such as that illustrated in FIG. 1, in one or more embodiments.

Figure 2A:
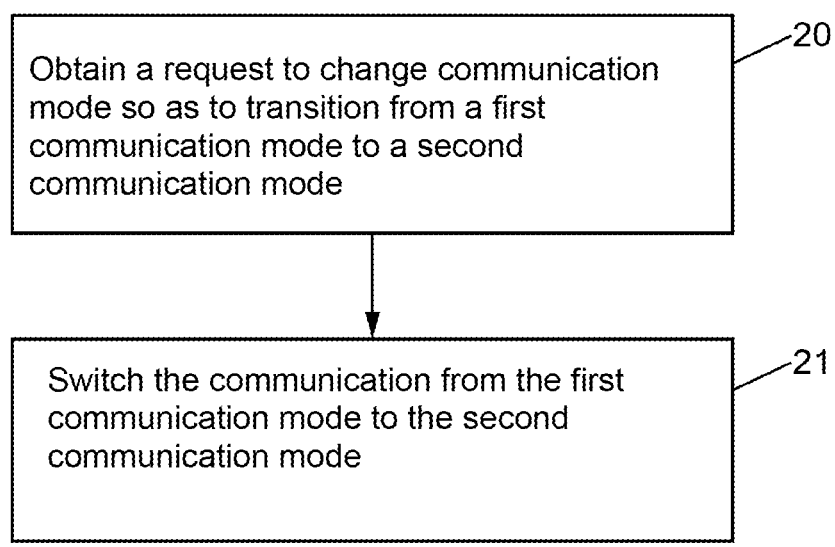
FIG. 2a is a diagram illustrating a proposed method according to one or more embodiments.

With reference to FIGS. 1 and 2a, in one or more embodiments, one of the terminals (3a) participating in the communication may obtain (20) a request to change communication mode so as to transition from a first communication mode to a second communication mode, the first communication mode and the second communication mode being different communication modes in a set of communication modes supported by the telecommunications system, for example comprising a two-way voice (of the conversational type) communication mode, a one-way voice communication mode, and a text-based communication mode.

Different scenarios may be conceivable for the request, depending on the first communication mode wherein the communication is found when the request is obtained (initial communication mode): when the initial communication mode is the two-way voice communication mode, the request to change mode may be a request to transition from this initial communication mode to a one-way voice communication mode, or to a text-based communication mode. When the initial communication mode is the one-way voice communication mode, the request to change mode may be a request to transition from this initial communication mode to a two-way voice communication mode, or to a text-based communication mode. When the initial communication mode is the text-based communication mode, the request to change mode may be a request to transition from this initial communication mode to a one-way voice communication mode, or to a two-way voice communication mode.

In one or more embodiments, the different communication modes considered (as they are supported by the telecommunications system) may be classified according to an order of eligibility, for example depending on their requirements in terms of latency and the rate of the associated service. In these scenarios, the telecommunications system may be configured so that a mode change from a first communication mode can only be requested to a second communication mode determined according to the first communication mode. For example, the system may be configured so that a request to change mode from the first two-way voice communication mode can only be a request to transition from this mode to a one-way voice communication mode (and not directly to a text-based communication mode). At the other end of the mode classification, the system may be configured so that a request to change mode from the text-based communication mode can only be a request to transition from this mode to a one-way voice communication mode (and not directly to a two-way voice communication mode). Therefore, in embodiments using a set of communication modes comprising a two-way voice communication mode, a one-way voice communication mode, and a text-based communication mode, each mode of the set may be associated with an eligibility level (for example, level 1 for the text-based communication mode, level 2 for the one-way voice communication mode, and level 3 for the two-way voice communication mode), and the system may be configured so that a change in mode carries out a transition from an initial communication mode with a given eligibility level to another mode with an eligibility level immediately higher or lower than that of the initial communication mode.

The proposed method may advantageously make it possible to transition the communication in progress from a first communication mode to a second communication mode. By using the proposed method, a telecommunications services provider (such as an operator) may therefore provide a conversational telecommunications service that is flexible in its form, in order to be adapted, without interrupting service, to the changes in link quality in a much wider range than that taking place in the prior art.

Figure 2B:
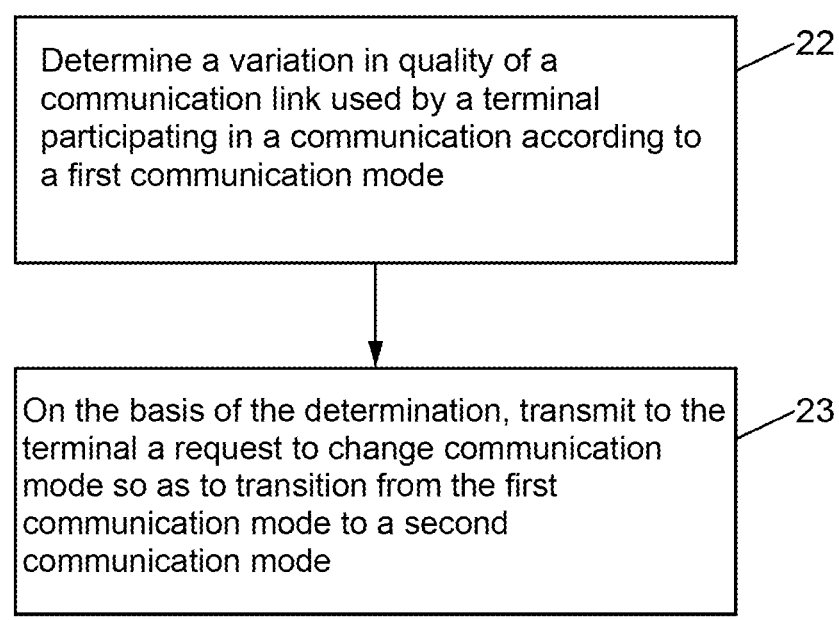
FIG. 2b is a diagram illustrating a proposed method according to one or more embodiments.

With reference to FIGS. 1 and 2b, in one or more embodiments, a network infrastructure node of a telecommunications system may be configured to determine (22) a variation in quality of a communication link used by a first terminal participating in a communication in progress according to a first communication mode and connected to the access network infrastructure. The network infrastructure node may also be configured to, on the basis of the determination of the variation in quality of the communication link, transmit (23) to the first terminal a request to change communication mode so as to transition from the first communication mode to a second communication mode, the first communication mode and the second communication mode being different communication modes in a set comprising a two-way voice communication mode, a one-way voice communication mode, and a text-based communication mode.

FIG. 2b therefore illustrates embodiments wherein the network infrastructure participates in the decision to change communication mode so as to transition from a first mode to a second mode, which advantageously makes it possible to streamline the implementation of the proposed method within communication terminals.

Figure 3:
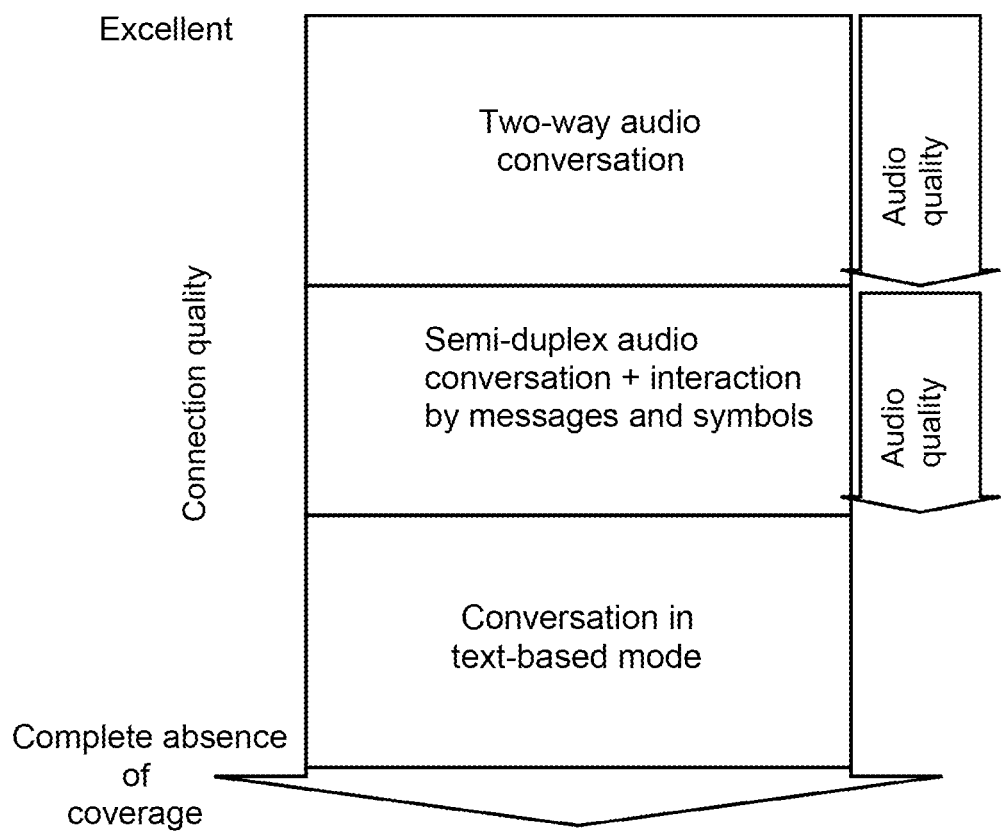
FIG. 3 is a diagram illustrating a set of communication modes according to one or more embodiments.

FIG. 3 illustrates a set of communication modes according to one or more embodiments.

With reference to FIG. 3, a communication in progress in a first communication mode can be modified to be carried out in a second communication mode, the first mode and the second mode both belonging to a set of modes comprising a two-way audio conversational communication mode, a semi-duplex audio conversational mode, this mode may possibly, in one or more embodiments, also provide for two-way interaction between the two communication terminals by messages and/or by symbols, and a communication mode in text-based mode conversation. For example, a message may indicate a request to speak, an opinion, to the speaker occupying the transmission channel. A smiley-type symbol may represent a message according to an agreement known to the parties to the communication. As illustrated in FIG. 3, in one or more embodiments, each of the communication modes usable for a mode change can be ranked or classified according to an order of eligibility or priority. With reference to FIG. 3 that illustrates an embodiment wherein three communication modes are eligible, the full-duplex audio conversational communication mode may be assigned a high level of priority, from among a high level, an intermediate level and a low level, to only be used when the communication quality is at its highest level. When the connection quality level and/or the audio quality level of the communication lowers, a transition to the semi-duplex audio conversational communication mode may be carried out in order to maintain the service while adapting to a poorer connection quality and/or to a poorer voice communication audio quality. Likewise, in the case where the communication is in semi-duplex audio conversational communication mode, when the connection quality level and/or the audio quality level of the communication lowers, a transition to the text-based communication mode may be carried out in order to maintain the service while adapting to a poorer connection quality and/or to a poorer voice communication audio quality. Therefore, the communication mode may be adapted while maintaining the service, transparently to the user, as the audio quality of the voice communication and/or the connection quality deteriorates. Conversely, in the case where the communication is in text-based communication mode, when the connection quality level increases, a transition to the semi-duplex audio conversational communication mode may be carried out in order to maintain the service while adapting to a better connection quality. Similarly, in the case where the communication is in semi-duplex audio conversational communication mode, when the connection quality level and the audio quality level of the communication increases, a transition to the two-way audio conversational communication mode may be carried out in order to maintain the service while adapting to a better connection quality and to a better voice communication audio quality.

The use of one or more radio communication links is a typical example of situations wherein the connection quality may change during a communication. The proposed method may therefore advantageously be implemented in a telecommunications system that comprises a radio access network infrastructure for managing communication between terminals, among which a first terminal is a radio terminal that uses a radio communication link between the first terminal and the radio access network infrastructure of the telecommunications system.

In particular, the proposed method may advantageously be implemented in cases where the radio access network infrastructure is a network infrastructure with extended radio coverage, for example based on a method leading to a lower rate and/or an increase in latency according to the coverage extension level as such, for example by transmitting data with a large number of repetitions, and wherein the first terminal is located in a radio coverage extension zone of the radio access network infrastructure of the telecommunications system. In these scenarios, the first terminal may be in a situation of sustaining an increase in latency when the quality of its radio coverage (and therefore of its radio link) with the network infrastructure with extended radio coverage deteriorates, when the network infrastructure will be configured to mitigate this deterioration by increasing the number of repetitions for the transmission of data from and/or to the first radio terminal. The communication quality may be monitored by the terminal and/or by the network to detect changes, and if so to propose transitioning from one communication mode to another according to the proposed method. For example, the proposed method may advantageously be implemented in a telecommunications system comprising a radio communications network using the LTE-M technology.

In one or more embodiments, obtaining a request to change communication mode by a first terminal participating in the communication may comprise, at the first terminal, the receipt of the request.

In embodiments in which the telecommunications system is configured so that the decision to change communication mode is made at the level of an access network infrastructure of the telecommunications system to which the first terminal is connected, the request will be received at the first terminal from this access network infrastructure. The first terminal could be configured to then, upon receipt of the request to change communication mode, possibly after having determined if it supports the communication mode change requested in the request, transmit to the terminal or, depending on the scenario, to the terminals with which it is in communication, a request to change communication mode in order to implement this mode change in a coordinated manner at the ends of the communication. These embodiments, which involve the communication network infrastructure of the telecommunications system in the change of communication mode of a communication between several terminals, advantageously enable an uncomplicated implementation of the mode change at the terminal level, insofar as they only implement decisions made at the network infrastructure level and transmitted via the mode change request.

In embodiments wherein the telecommunications system is configured so that the decision to change communication mode is made at the level of a terminal engaged in a communication, the request can be received at the first terminal from another terminal with which it is in communication. The first terminal can be configured to then, upon receipt of the request to change communication mode, possibly after having determined if it supports the communication mode change requested in the request, implement the communication mode change, without the communication network infrastructure to which it is connected participating in this mode change. Coordination of the communication mode change between the different terminals concerned may use any type of coordination mechanism known in itself, such as, for example, a mechanism known as a "double handshake." These embodiments, which do not necessarily involve the communication network infrastructure of the telecommunications system in the change of communication mode of a communication between several terminals, or wherein the involvement of the communication network infrastructure of the telecommunications system in the change of communication mode is limited, advantageously enable an autonomous implementation of the communication mode change at the terminal level.

In one or more embodiments, obtaining a request to change communication mode by a first terminal participating in the communication may comprise, at the first terminal, the generation of the request to change communication mode so as to transition from a first communication mode to a second communication mode.

In these embodiments, the first terminal may be configured to monitor one or more communication mode change decision criteria, and upon determining that a mode change decision criterion is fulfilled, and therefore that a mode change should be carried out, to generate a communication mode change request to transmit this request to the terminal, or depending on the scenario, to the terminals with which the first terminal is in communication.

Depending on the embodiment selected, different communication mode change decision criteria may be used. For example, in one or more embodiments, a quality criterion of at least one communication link used for the communication in progress may be used to make the decision to change the communication mode, as it is carried out at the level of a terminal or at the level of the communication network infrastructure used for the communication.

In one or more embodiments, a decision to change communication mode may be made on the basis of an end-to-end latency criterion of the communication. For example, in a radio network with extended radio coverage (for example, using the LTE-M technology), the end-to-end latency, i.e. latency between the first terminal and the other terminal(s) with which the first terminal is in communication, may be measured regularly, for example periodically, so as to detect a change in latency (deterioration or improvement) beyond a threshold defined by an end-to-end latency criterion. Exceeding the threshold, which is not necessarily identical for deterioration (increase) and for improvement (reduction) of the latency, can, in one or more embodiments, trigger the determination that the communication mode change criterion is fulfilled; which leads to a request to change mode according to one of the embodiments of the proposed method. The use of an end-to-end latency criterion is particularly well adapted to the situation wherein a terminal A is in communication with a terminal B, terminal A having good-quality radio coverage, but terminal B is in a restrictive situation from the point of view of the quality of its radio coverage. In this case, it may be advantageous to consider end-to-end latency, i.e. latency between terminal A and terminal B, possibly combined with the available rate, for making the decision to change the communication mode according to the proposed method.

In one or more embodiments, a decision to change communication mode may be made on the basis of a communication rate criterion. For example, in a radio network with extended radio coverage (for example, using the LTE-M technology), the rate of the radio link between the first terminal and a radio access network infrastructure of the telecommunications system may be measured regularly, for example periodically, so as to detect a change in rate (deterioration or improvement) beyond a threshold defined by a rate criterion. Exceeding the threshold, which is not necessarily identical for deterioration (reduction) and for improvement (increase) of the rate, can, in one or more embodiments, trigger the determination that the communication mode change criterion is fulfilled, which leads to a request to change mode according to one of the embodiments of the proposed method.

In one or more embodiments, a decision to change communication mode may be made on the basis of a criterion using a radio communication parameter for the communication using at least one radio communication link For example, in a radio network with extended radio coverage (for example, using the LTE-M technology), one or more signal quality levels (for example, a reference signal received quality (RSRQ)) indicator, one or more radio signal received power levels (for example, a reference signal received power (RSRP) indicator) by the first terminal and/or by a radio access network infrastructure of the telecommunications system to which the first terminal is connected, may be measured regularly, for example periodically, so as to detect a change in power level (deterioration or improvement) of the received signal beyond a threshold defined by a received signal power level criterion. Exceeding the threshold, which is not necessarily identical for deterioration (reduction) and for improvement (increase) of the received signal power level, can, in one or more embodiments, trigger the determination that the communication mode change criterion is fulfilled, which leads to a request to change mode according to one of the embodiments of the proposed method. For example, in a radio network with extended radio coverage (for example, using the LTE-M technology), a parameter relating to the number of repetitions in the radio signal transmission between the first terminal and a radio access network infrastructure of the telecommunications system to which the first terminal is connected, may be measured regularly, for example periodically, so as to detect a parameter value change (deterioration or improvement, for example due to an increasing or decreasing number of repetitions) beyond a threshold defined by a criterion relating to the number of repetitions. Exceeding the threshold, which is not necessarily identical for deterioration (increase in the number of repetitions) and for improvement (decrease in the number of repetitions) of the parameter, can, in one or more embodiments, trigger the determination that the communication mode change criterion is fulfilled, which leads to a request to change mode according to one of the embodiments of the proposed method.

Monitoring of a criterion used for making the decision to change communication mode may comprise obtaining measurements corresponding to the monitored criterion. For example, monitoring a quality criterion of a communication link may comprise obtaining quality measurements of the communication link Depending on the embodiment, criterion monitoring may be implemented autonomously by a terminal configured to implement the proposed method, or by the network infrastructure to which the terminals participating in the communication are connected and configured to implement the proposed method.

For example, criterion monitoring may be carried out autonomously in one or more embodiments by a communication application executed on a terminal. The communication application may be configured to make or obtain data (parameter value estimate or measurement) for the implementation of the communication mode change decision criterion. For example, the communication application may be configured to carry out rate and/or latency measurements relating to a communication in progress, and to use these data to implement a communication mode change decision criterion.

In one or more embodiments, the communication application may be configured to obtain data for the implementation of the communication mode change decision criterion, for example data generated and/or obtained by the lower layers executed by the terminal (physical layer, medium access control layer (MAC, for "Medium Access Control"), for example via an application interface of the API ("Application Programming Interface") type. Therefore, in one or more embodiments, a terminal configured to implement the proposed method may be equipped with an application programming interface, or any other type of interface configured to transmit data to a communication application for the implementation of a communication mode change decision criterion.

In one or more embodiments, a terminal may also be configured to receive from the network infrastructure to which it is connected data (for example, results of value measurements and/or estimates) relating to the parameters, for example the radio layer (for example, a number of repetitions necessary to transmit data from and/or to the terminal), that it monitors for making the decision to change communication mode according to the proposed method. In one or more embodiments, a terminal may be configured to, upon receipt of these data relating to the parameters, exploit these data and/or transmit them to one or more terminals with which it is in communication.

In one or more embodiments, the implementation of the proposed method may rely heavily on data that the network infrastructure to which at least one of the terminals is connected for the communication may generate and/or obtain. For example, the network infrastructure may be configured to transmit regularly, for example periodically, data relating to end-to-end latency to the terminal, or performance data and/or quality data enabling the terminal to determine an estimate of end-to-end latency for making a decision on a communication mode change according to the proposed method.

In one or more embodiments, a user of the terminal in communication may be notified of a communication mode change via a user interface, such as a man-machine interface configured on the terminal to implement the proposed method.

In one or more embodiments, the proposed method may also comprise the generation, on a man-machine interface of a first terminal, of a message signaling the communication mode change so as to transition from the first communication mode to a second communication mode. Depending on the embodiment, the signaling message can be a user information message relating to a communication mode change or a user query message prior to a communication mode change. In the latter case, a communication application configured to implement the proposed method can be configured to obtain a user command authorizing or not authorizing a communication mode change. Including a user command is particularly advantageous for improving the user experience, particularly in the scenario where the communication mode change leads to the use of a communication mode that has deteriorated compared to the communication mode in progress. The user may, in fact, refuse the transition to a communication mode that is deemed too deteriorated, and may prefer a possible interruption in communication.

In one or more embodiments, switching the communication in progress to a text-based communication mode from a non-text-based communication mode (for example, a voice communication mode) may trigger the display, on a graphical interface of one or more terminal(s) engaged in the communication in progress, a text content on the basis of a transcript of a voice content from the non-text-based communication mode prior to switching. Supplying a text content corresponding, for example, to a voice content of the communication before a communication mode change resulting in quitting a voice communication mode makes it possible to improve the user experience, by supporting the transition from a voice communication mode to a text-based communication mode.

Figure 4A:
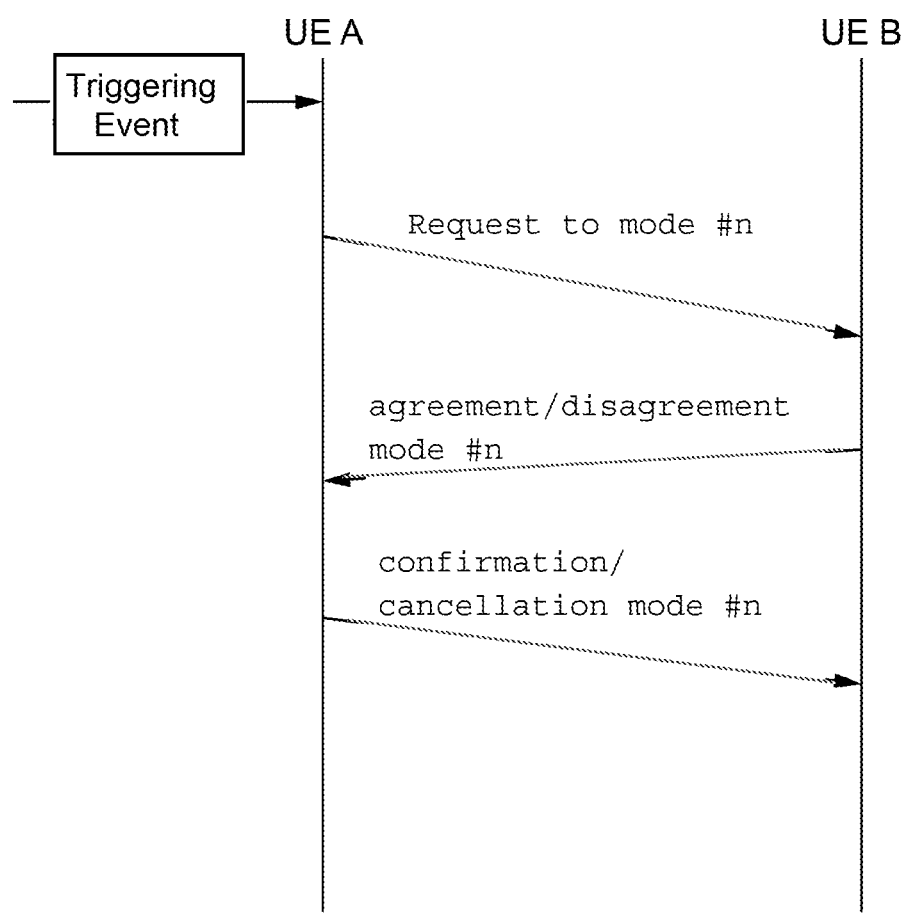
FIG. 4a is a diagram illustrating message exchanges between two terminals according to one or more embodiments.

FIG. 4a is a diagram illustrating message exchanges between two terminals according to one or more embodiments wherein the communication mode change is controlled by the terminals.

With reference to FIG. 4a, a first terminal (UE A) in communication with a second terminal (UE B) according to a first communication mode across a communication network (not represented in the figure) determines the occurrence of an event triggering the communication mode change to transition from the first communication mode to a second communication mode. In one or more embodiments, the triggering event may be associated with the monitoring of the quality of a communication link between the first terminal and the second terminal by an application executed on the first terminal (UE A). Depending on the embodiment, the application may, for the needs of this monitoring, have access or not have access to radio link measurements, if necessary, for example of the RSRP/RSRQ measurement type associated with the lower layer control plane. Upon detection of the triggering event, the first terminal (UE A) can transmit to the second terminal (UE B) a request to change communication mode ("request to mode #n") to a mode #n, different from the current communication mode, and for example selected from among a set comprising a two-way voice communication mode (mode #1), a one-way voice communication mode (mode #2, for example a PTT type communication mode), and a text-based communication mode (mode #3, for example an SMS type communication mode). The second terminal (UE B) may be configured to, upon receipt of the request to change communication mode, determine if it supports the mode change to the second communication mode and/or determine if it accepts or refuses, for any other reason, the transition from the first communication mode to the second communication mode, and correspondingly respond to the first terminal (UE A) ("agreement/disagreement mode #n"). The first terminal (UE A) may be configured to, upon receipt of the response from the second terminal (UE B) and on the basis of this response, determine if the mode change is confirmed or cancelled, and respond to the second terminal (UE B) according to this determination ("confirmation/cancellation mode #n").

Figure 4B:
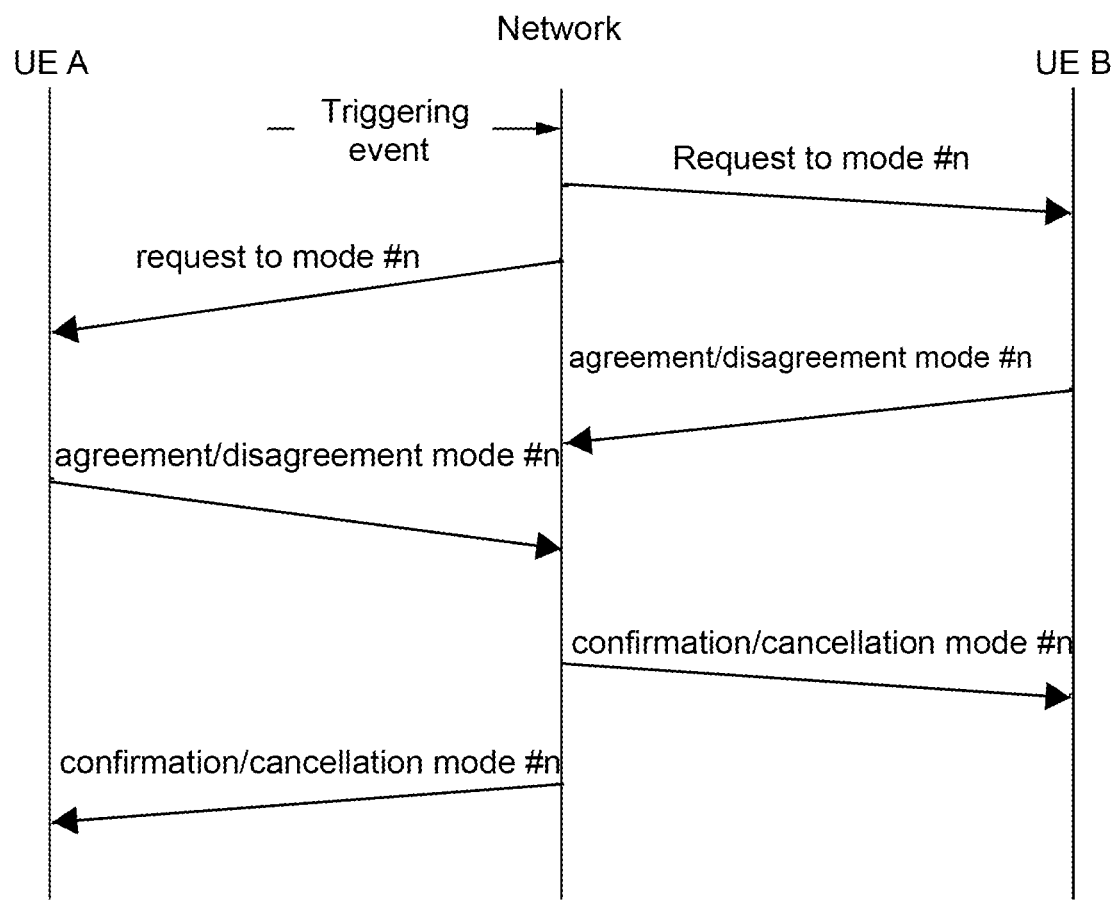
FIG. 4b is a diagram illustrating message exchanges between two terminals through a network infrastructure according to one or more embodiments.

FIG. 4b is a diagram illustrating message exchanges between two terminals according to one or more embodiments wherein the communication mode change is controlled by the network.

With reference to FIG. 4b, a first terminal (UE A) is in communication with a second terminal (UE B) according to a first communication mode across a communication network (Network). One or more nodes of the network may be configured to determine the occurrence of an event triggering the communication mode change so as to transition from the first communication mode to a second communication mode. In one or more embodiments, the triggering event may be associated with the monitoring of the quality of a communication link between the first terminal and the second terminal by the network. Monitoring of the communication link carried out by the network may use parameter measurements (for example of the RSRP/RSRQ measurement type associated with the lower layer control plane) obtained or carried out by the network independently from the implementation of the proposed method. Upon detection of the triggering event, the network (Network) can transmit to the first terminal (UE A) and to the second terminal (UE B) a request to change communication mode ("request to mode #n") to a mode #n, different from the current communication mode, and for example selected from among a set comprising a two-way voice communication mode (mode #1), a one-way voice communication mode (mode #2, for example a PTT type communication mode), and a text-based communication mode (mode #3, for example an SMS type communication mode).

Each of the first (UE A) and second (UE B) terminals may be configured to, upon receipt of the request to change communication mode, determine if it supports the mode change to the second communication mode and/or determine if it accepts or refuses, for any other reason, the transition from the first communication mode to the second communication mode, and correspondingly respond to the network (Network) ("agreement/disagreement mode #n"). The network (Network) node(s) configured to implement the proposed method may be configured to, upon receipt of the responses from the first terminal (UE A) and from the second terminal (UE B) and on the basis of these responses, determine if the mode change is confirmed or cancelled, and respond to the first terminal (UE A) and to the second terminal (UE B) according to this determination ("confirmation/cancellation mode #n").

In one or more embodiments, the proposed method advantageously makes it possible to choose dynamically the communication mode presenting the best comfort, while remaining compatible with the features of the current link Therefore, a communication starting under very good connection conditions (for example, a two-way telephone conversation with high audio quality) may change to a communication with a progressively deteriorating audio quality if the connection quality deteriorates. If the link quality continues to deteriorate and passes below a preconfigured rate or latency threshold that no longer enables a two-way conversation to be maintained, the communication may transition, transparently and without the initiative of the users, to a semi-duplex communication mode (such as, for example, a PTT type communication mode). In one or more embodiments, this transition may be announced to the participants by an audible signal. In order to maintain a certain interactivity despite the absence of two-way voice communication, the conversation in semi-duplex mode may be enhanced by an exchange of information (symbols, text) on the part of users not speaking to the active speaker.

A speech request system by the same channel may also be put into place in one or more embodiments to make it possible to identify the next speaker once the conversation has started. Here again, an audible signal may indicate to the active speaker that someone has requested to speak. In addition, in the same manner as in the case of two-way communication, it may be provided that the compression rate of the audio encoders is adapted to the capacity of the link If the link quality continues to further deteriorate and no longer enables a semi-duplex audio conversation to be maintained, the conversation may change, transparently and without the initiative of the participants in conversation mode, by the exchange of text messages.

In one or more embodiments, a quality criterion of the connection can be used to trigger transitions between different modes. For example, a composite criterion may be used to take into account all factors that may affect the comfort of the conversation, such as the available rate, the average latency, the latency jitter, etc. In one or more embodiments, the criterion may itself be dynamic in order to only take the most relevant points into account following the transition to be carried out. Therefore, for example, latency is a determining criterion in the maintenance of a two-way conversation or in its change to a semi-duplex conversation. Conversely, this same latency no longer has the same relevance when it comes to a transition from a semi-duplex audio conversation to a conversation in text mode. In one or more embodiments, a hysteresis mechanism may be used to prevent a risk of instability during transitions between communication modes.

In one or more embodiments, implementation of the proposed method may use a return by the terminal to the average power (P) and received interference (I) measurement network. For example, each communication mode may be associated with a minimum P and P/I threshold. For example, the transition from the conversational mode to the half-duplex mode can be decided in situations where P and P/I transition below the preconfigured thresholds Pmin and P/Imin, respectively.

Implementation of the proposed method is particularly advantageous in the context of the use of LTE-M technology insofar as this technology enables the support of normal telephone conversations when the terminals are in a conventional LTE coverage zone. When an LTE-M terminal moves away from this zone, the network coverage is maintained, via the extended coverage. Extended coverage using transmission repetitions may lead to a progressive lowering of the available rate and an increase in latency, to the point where two-way telephone communication cannot be maintained. The proposed method makes it possible to avoid disconnection and to prolong the conversation in a mode that is better adapted to the available connection. It should be noted that in this context, the indication of the number of repetitions used may directly provide an indication of the quality of the link representative of both rate and latency.

Figure 5A:
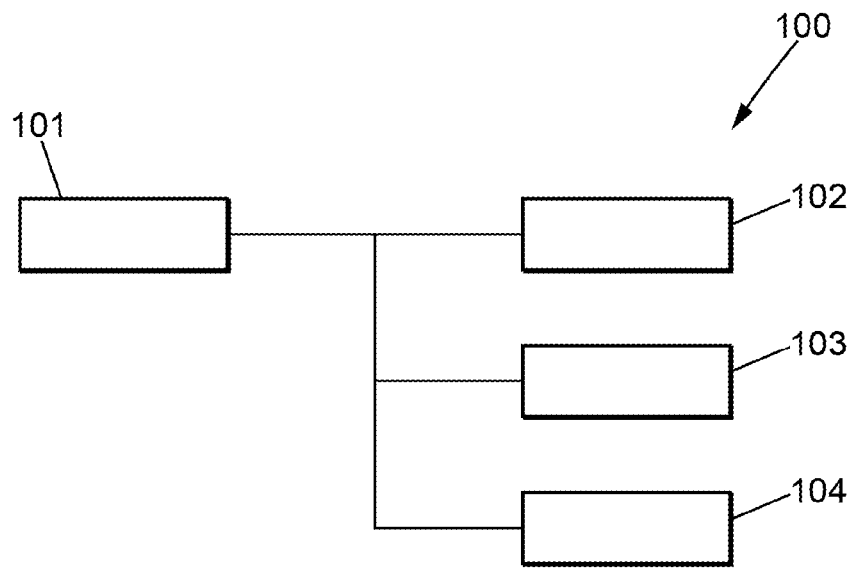
FIG. 5a illustrates an example of terminal architecture for the implementation of the proposed method according to one or more embodiments.

FIG. 5a illustrates an example of terminal architecture for the implementation of the proposed method.

With reference to FIG. 5a, device 100 comprises a controller 101, operatively coupled to a communication interface 102 and to a memory 103, which controls a communication management module 104.

Communication interface 102 comprises one or more communication units, each configured to transmit and/or receive data according to one or more data and/or voice communication protocols (by wire or wireless), for example of the WLAN, Ethernet, UMTS, LTE, LTE-A, or LTE-M type.

Controller 101 is configured to control communications management module 104 and communication interface 102 for the implementation of one or more embodiments of the proposed method.

Communications management module 104 is configured to implement the proposed method by a terminal. In particular, communications management module 104 may be configured to fulfill the functions and perform the acts described in the present description for the implementation of the proposed method by a terminal. In one or more embodiments, communications management module 104 is configured to obtain a request to change communication mode for a communication in progress, so as to transition from a first communication mode to a second communication mode, and to switch the communication from the first communication mode to the second communication mode. Depending on the embodiment of the communication management mode 104, the request to change communication mode may be generated by module 104, or may be received by another terminal, or the network to which the terminal is connected.

Device 100 may be a computer, a computer network, an electronic component, or another device comprising a processor operatively coupled to a memory, as well as, depending on the embodiment selected, a data storage unit, and possibly other associated hardware elements such as a network interface and a media drive for reading a removable storage drive and writing on such a drive, (not represented in the figure). The removable storage drive may be, for example, a USB key, an SSD memory, etc. Depending on the embodiment, the memory, data storage unit and/or removable storage drive contain instructions that, when executed by controller 101, cause controller 101 to execute or control the communication management module 104 and communication interface 102 parts of the embodiments of the proposed method described in the present description. Controller 101 may be a component implementing a processor or a calculating unit for the management of communications according to the proposed method and the control of units 102 and 104 of device 100.

Device 100 may be implemented as software, as hardware, as an application specific integrated circuit (ASIC), or as a combination of hardware and software elements, such as for example a software program intended to be loaded and executed on an FPGA (Field Programmable Gate Array) type component. Likewise, communication management module 104 may be implemented as software (for example via functionalities configured in a communication application executed on the terminal), as hardware, as an ASIC, or as a combination of hardware and software elements, such as for example a software program intended to be loaded and executed on an FPGA type component.

Figure 5B:
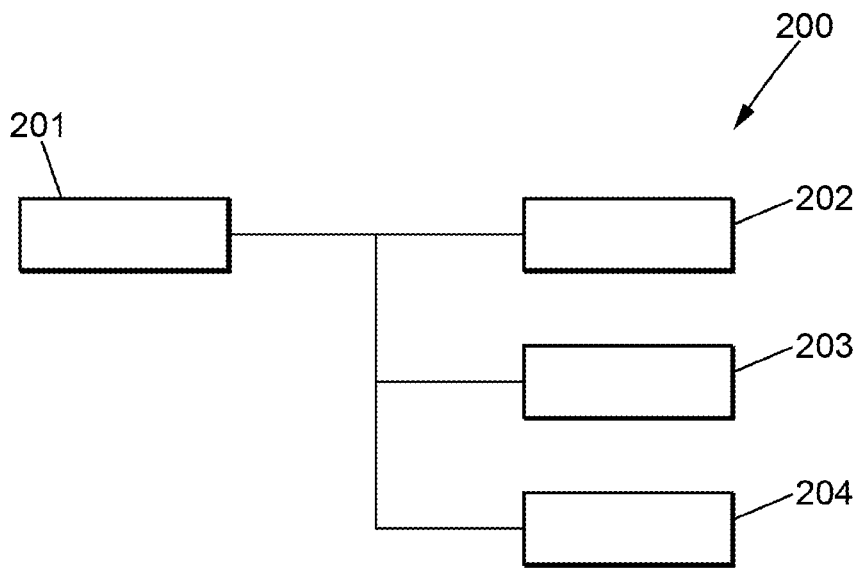
FIG. 5b illustrates an example of communication network node architecture for the implementation of the proposed method according to one or more embodiments.

FIG. 5b illustrates an example of communication network node architecture for the implementation of the proposed method.

With reference to FIG. 5b, device 200 comprises a controller 201, operatively coupled to a communication interface 202 and to a memory 203, which controls a module for managing communication between terminals 204.

Communication interface 202 comprises one or more communication units, each configured to transmit and/or receive data according to one or more data and/or voice communication protocols (by wire or wireless), for example of the WLAN, Ethernet, UMTS, LTE, LTE-M, and LTE-A type.

Controller 201 is configured to control relay service module 204 and communication interface 202 for the implementation of one or more embodiments of the proposed method.

The module for managing communication between terminals 204 is configured for the implementation of the proposed method by a network infrastructure node usable for managing communication between network terminals. In particular, the module for managing communication between terminals 204 may be configured to fulfill the functions and perform the acts described in the present description for the implementation of the proposed method by a communication network node.

Device 200 may be a computer, a computer network, an electronic component, or another device comprising a processor operatively coupled to a memory, as well as, depending on the embodiment selected, a data storage unit, and other associated hardware elements such as a network interface and a media drive for reading a removable storage drive and writing on such a drive, (not represented in the figure). The removable storage drive may be, for example, a compact disk (CD), a digital versatile disk (DVD), a flash memory, a USB key, an SSD memory, etc. Depending on the embodiment, the memory, data storage unit or removable storage drive contains instructions that, when executed by controller 201, cause controller 201 to execute or control the module for managing communication between terminals 204 and the communication interface 202 parts of the embodiments of the proposed method described in the present description. Controller 201 may be a component implementing a processor or a calculating unit for the management of communications according to the proposed method and the control of units 202 and 204 of device 200.

Device 200 may be implemented as software, as hardware, as an application specific integrated circuit (ASIC), or as a combination of hardware and software elements, such as for example a software program intended to be loaded and executed on an FPGA (Field Programmable Gate Array) type component. Likewise, relay service module 204 may be implemented as software, as hardware, as an ASIC, or as a combination of hardware and software elements, such as for example a software program intended to be loaded and executed on an FPGA type component.

Depending on the embodiment selected, certain acts, actions, events or functions of each of the methods described in the present document may be carried out or produced in a different order from that in which they were described, or may be added or merged or else may not be carried out or produced, as the case may be. In addition, in certain embodiments, certain acts, actions or events are carried out or produced concurrently and not successively.

Although described across a certain number of detailed embodiments, the proposed controlling method and the device for implementing an embodiment of the method comprise different variants, modifications and enhancements that will obviously appear to the person skilled in the art, it being understood that these different variants, modifications and enhancements form part of the scope of the present subject disclosure, as defined in the following claims. In addition, the different aspects and features described above may be implemented together, or separately, or else may be substituted for one other, and all of the different combinations and sub-combinations of the aspects and features form part of the scope of the present subject disclosure. Furthermore, it may be that certain systems and equipment described above do not incorporate all the modules and functions described for the preferred embodiments.

The invention claimed is:

1. A method comprising:
   managing a communication setup according to a first communication mode between terminals in a telecommunications system, the managing comprising:
   obtaining, by a first terminal participating in the communication, a communication mode change request to switch from the first communication mode to a second communication mode; and
   switching the communication from the first communication mode to the second communication mode;
   wherein:
   the first communication mode and the second communication mode are different communication modes in a set comprising a voice communication mode and a text-based communication mode, wherein the voice communication mode is a two-way or a one-way voice communication mode;
   obtaining the request comprises, at the first terminal, generating the communication mode change request so as to transition from the first communication mode to the second communication mode;
   the communication between the first terminal and a second terminal uses a communication link; and
   the method comprising, at the first terminal, obtaining quality measurements of the communication link and generating the communication mode change request on the basis of the communication link quality measurements.

2. The method according to claim 1, wherein the telecommunications system comprises a radio access network infrastructure, and wherein the first terminal is a radio terminal and the communication uses a radio communication link between the first terminal and the radio access network infrastructure of the telecommunications system.

3. The method according to claim 2, wherein the radio access network infrastructure is network infrastructure with extended radio coverage, and wherein the first terminal is located in an extended radio coverage zone of the telecommunications system radio access network infrastructure.

4. The method according to claim 1, wherein obtaining the request comprises, at the first terminal:
   receiving the communication mode change request from a telecommunications system access network infrastructure.

5. The method according to claim 4, further comprising, at the first terminal:
   transmitting, to a second terminal participating in the communication, a communication mode change request so as to transition from the first communication mode to the second communication mode.

6. The method according to claim 1, wherein obtaining the request comprises, at the first terminal:
   receiving the communication mode change request from a second terminal participating in the communication.

7. The method according to claim 1, wherein obtaining the communication link quality measurements comprises receiving the measurements or generating the measurements.

8. The method according to claim 1, wherein the communication link quality measurements relate to a quality criterion of the communication link, the quality criterion comprising at least one of a criterion of the end-to-end latency of the communication, a communication link rate criterion, and/or a criterion using a radio communication parameter.

9. The method according to claim 8, wherein the criterion using a radio communication parameter relates to at least one of a power of a radio signal received by the first terminal, and a number of repetitions in the radio signal transmission.

10. The method according to claim 9, also comprising:
   receiving a user input relating to the communication mode switch from the first communication mode to the second communication mode.

11. The method according to claim 1, also comprising:
generating on a man-machine interface of the first terminal a message signaling the communication mode switch from the first communication mode to the second communication mode.

12. The method according to claim 1, also comprising:
upon switching communication to the text-based communication mode from a voice communication mode, displaying on a graphical interface of the first terminal a text content based on a transcript of a voice content of the communication in audio mode before switching to the text-based communication mode.

13. A method comprising:
managing a communication between terminals in a telecommunications system comprising a network infrastructure, the managing comprising, at an access network infrastructure node, the communication being in progress according to a first communication mode:
determining a variation in quality of a communication link used by a first terminal participating in the communication and connected to the network infrastructure; and
based on the determination of the variation in quality of the communication link, transmitting to the first terminal a communication mode change request to switch from the first communication mode to a second communication mode;
wherein the first communication mode and the second communication mode are different communication modes in a set comprising a voice communication mode and a text-based communication mode, wherein the voice communication mode is a two-way or a one-way voice communication mode.

14. Terminal equipment comprising:
a processor and a communication interface operatively coupled to the processor, configured to implement a method of managing a communication setup according to a first communication mode between terminals in a telecommunications system, the method comprising:
obtaining, by a first terminal participating in the communication, a communication mode change request to switch from the first communication mode to a second communication mode; and
switching the communication from the first communication mode to the second communication mode;
wherein:
the first communication mode and the second communication mode are different communication modes in a set comprising a voice communication mode and a text-based communication mode, wherein the voice communication mode is a two-way or a one-way voice communication mode;
obtaining the request comprises, at the first terminal, generating the communication mode change request so as to transition from the first communication mode to the second communication mode;
the communication between the first terminal and a second terminal uses a communication link; and
the method comprising, at the first terminal, obtaining quality measurements of the communication link and generating the communication mode change request on the basis of the communication link quality measurements.

15. The terminal equipment according to claim 14, wherein the telecommunications system comprises a radio access network infrastructure, and wherein the first terminal is a radio terminal and the communication uses a radio communication link between the first terminal and the radio access network infrastructure of the telecommunications system.

16. The terminal equipment according to claim 15, wherein the radio access network infrastructure is network infrastructure with extended radio coverage, and wherein the first terminal is located in an extended radio coverage zone of the telecommunications system radio access network infrastructure.

17. The terminal equipment according to claim 14, wherein obtaining the communication link quality measurements comprises receiving the measurements or generating the measurements.

18. The terminal equipment according to claim 14, wherein the communication link quality measurements relate to a quality criterion of the communication link, the quality criterion comprising at least one of a criterion of the end-to-end latency of the communication, a communication link rate criterion, and/or a criterion using a radio communication parameter.

19. A data communication network node comprising:
a processor and a communication interface operatively coupled to the processor, the network node being configured to implement a method of managing a communication between terminals in a telecommunications system comprising a network infrastructure, the method comprising, at an access network infrastructure node, the communication being in progress according to a first communication mode:
determining a variation in quality of the communication link used by a first terminal participating in the communication and connected to the network infrastructure;
based on the determination of the variation in quality of the communication link, transmitting to the first terminal a communication mode change request to switch from the first communication mode to a second communication mode; and
wherein the first communication mode and the second communication mode are different communication modes in a set comprising a voice communication mode and a text-based communication mode, wherein the voice communication mode is a two-way or a one-way voice communication mode.

20. A non-transitory storage medium of a computer executable program, comprising a set of data representing one or more programs, said one or more programs comprising instructions for, during execution of said one or more programs by a computer comprising a processing unit operatively coupled to a memory and to an input-output interface module, causing the computer to implement a method for managing a communication setup according to a first communication mode between terminals in a telecommunications system, the method comprising:
obtaining, by a first terminal participating in the communication, a communication mode change request to switch from the first communication mode to a second communication mode; and
switching the communication from the first communication mode to the second communication mode;
wherein:
the first communication mode and the second communication mode are different communication modes in a set comprising a voice communication mode and a text-based communication mode, wherein the voice communication mode is a two-way or a one-way voice communication mode;

obtaining the request comprises, at the first terminal, generating the communication mode change request so as to transition from the first communication mode to the second communication mode;
the communication between the first terminal and a second terminal uses a communication link; and
the method comprising, at the first terminal, obtaining quality measurements of the communication link and generating the communication mode change request on the basis of the communication link quality measurements.

* * * * *